United States Patent
Nurmi

(10) Patent No.: US 8,106,787 B2
(45) Date of Patent: Jan. 31, 2012

(54) WARNING SYSTEM INDICATING EXCESSIVE FORCE ON A TOUCH SCREEN OR DISPLAY

(75) Inventor: Juha Harri-Pekka Nurmi, Salo (FI)

(73) Assignee: Nokia Corporation, Espoo (FI)

( * ) Notice: Subject to any disclaimer, the term of this patent is extended or adjusted under 35 U.S.C. 154(b) by 638 days.

(21) Appl. No.: 12/291,894

(22) Filed: Nov. 14, 2008

(65) Prior Publication Data

US 2010/0123592 A1 May 20, 2010

(51) Int. Cl.
*G08B 21/00* (2006.01)
(52) U.S. Cl. .................. 340/665; 340/540; 345/173
(58) Field of Classification Search .............. 340/540, 340/665; 345/173
See application file for complete search history.

(56) References Cited

U.S. PATENT DOCUMENTS

| 2006/0103632 A1 | 5/2006 | Bourdelais et al. ........... 345/173 |
| 2006/0283267 A1 | 12/2006 | Tanabe ..................... 73/862.041 |

FOREIGN PATENT DOCUMENTS

| EP | 0817110 A2 | 1/1998 |
| JP | 2001054 155 | 2/2001 |
| WO | WO-03042805 A1 | 5/2003 |

*Primary Examiner* — Jeffery Hofsass
(74) *Attorney, Agent, or Firm* — Harrington & Smith

(57) ABSTRACT

Disclosed herein are apparatus, method, and computer program whereby a signal generated by a touch screen device is received in response to a tactile input from a user on an input surface of the touch screen panel. In response, presenting information to a user, the information comprising a warning that the user is exerting an excessive amount of force on a surface of the touch screen panel.

30 Claims, 19 Drawing Sheets

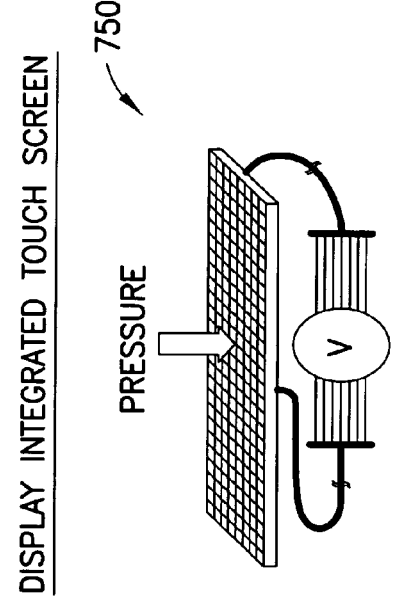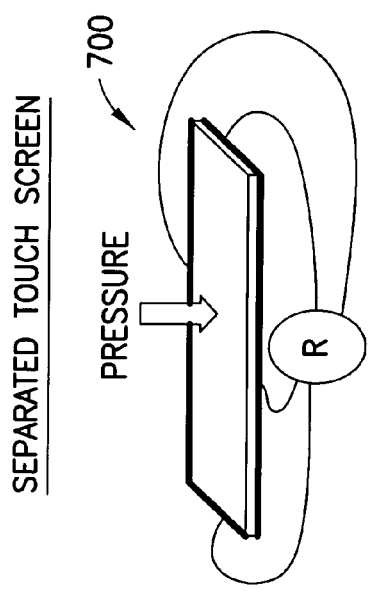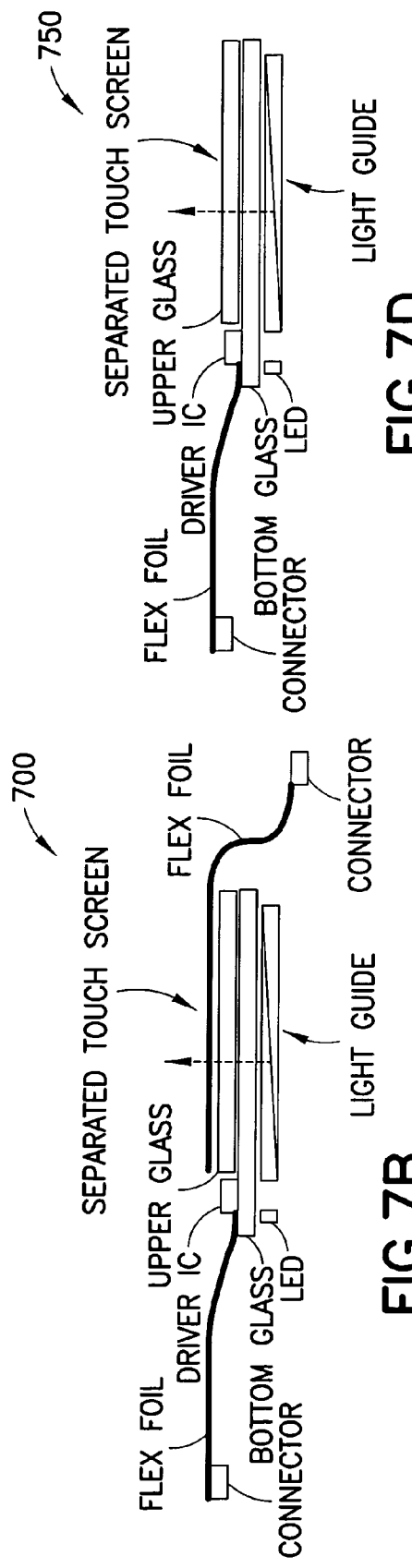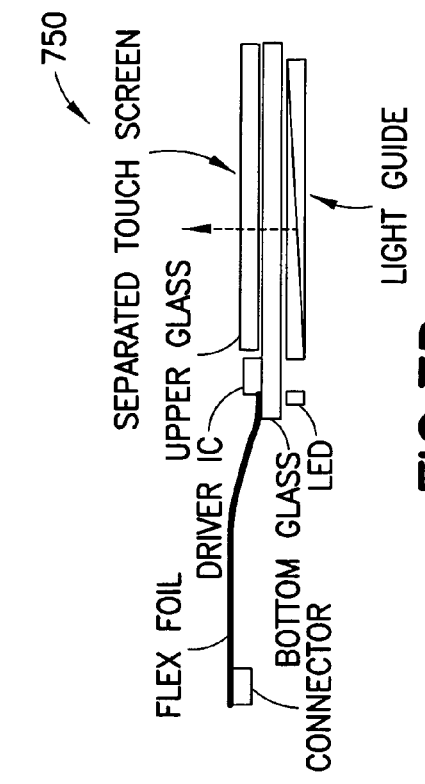

WARNING SYSTEM INDICATING EXCESSIVE FORCE ON A TOUCH SCREEN OR DISPLAY

TECHNICAL FIELD

The exemplary and non-limiting embodiments of this invention relate generally to touch screen devices and techniques to avoid inadvertent breakage of the touch screen device.

BACKGROUND

Various abbreviations that appear in the specification and/or in the drawing figures are defined as follows:
CP conductive parts
DAC digital to analog converter
GD gate driver
LCD liquid crystal display
LED light emitting diode
PCTSS pixel cells with touch screen sensors
RO readout
ROC readout circuit
SD source driver
TC timing controller
TSC touch screen controller
TSP touch screen panel
VCOM voltage common Touch screen display devices have become increasingly popular and are commonly implemented in many types of devices, including mobile communication devices. A touch screen may include a display which can detect the presence and location of a touch within a display area. Here, a touch is often thought of either as a force by hand or stylus pen. The implementation of a touch screen can be done in a number of ways including, but not limited to, the use of capacitive, resistive, and optical technology.

In these touch screen display devices a user controls the operation of the device via the user's own touch. In some devices that implement touch screen functions the users only method to operate the device is through touch. It can then be seen how the user's ability to navigate the touch screen display and apply proper amounts of force is of importance to the sustainability of the device.

A problem can arise due to the user being unaware of potentially applying an excessive amount of force on the touch screen/display panel.

SUMMARY

A first embodiment of the invention is a method comprising: receiving a signal generated by a touch screen device in response to a tactile input from a user on an input surface of the touch screen device; and in response, presenting information to a user, the information comprising a warning that the user is exerting an excessive amount of force on a surface of the touch screen device.

Another embodiment of the invention is a computer readable medium encoded with a computer program executable by a processor to perform actions comprising: receiving a signal generated by a touch screen device of the touch screen device in response to a tactile input from a user on an input surface; and in response, presenting information to a user, the information comprising a warning that the user is exerting an excessive amount of force on a surface of the touch screen device.

Another further embodiment of the invention is an apparatus comprising: an input surface configured to generate a signal in response to tactile input from a user; and an output configured to provide an output signal when the user is exerting an excessive amount of force on the input surface.

BRIEF DESCRIPTION OF THE DRAWINGS

In the attached Drawing Figures:

FIG. 6 is a still further illustration of display panel pixel cell control.

FIG. 7 is an illustration of two different touch screen configurations. FIGS. 7A and 7B provide illustration for a separated touch screen based on a sheet structure. FIGS. 7C and 7D provide illustration for a display integrated touch screen based on a matrix structure.

DETAILED DESCRIPTION

Currently devices that incorporate a touch screen fail to warn the user when he/she is pressing the surface of the touch screen or display panel with excessive force such that there is a possibility of damaging the surface, e.g., cracking or breaking it.

Figure 9:
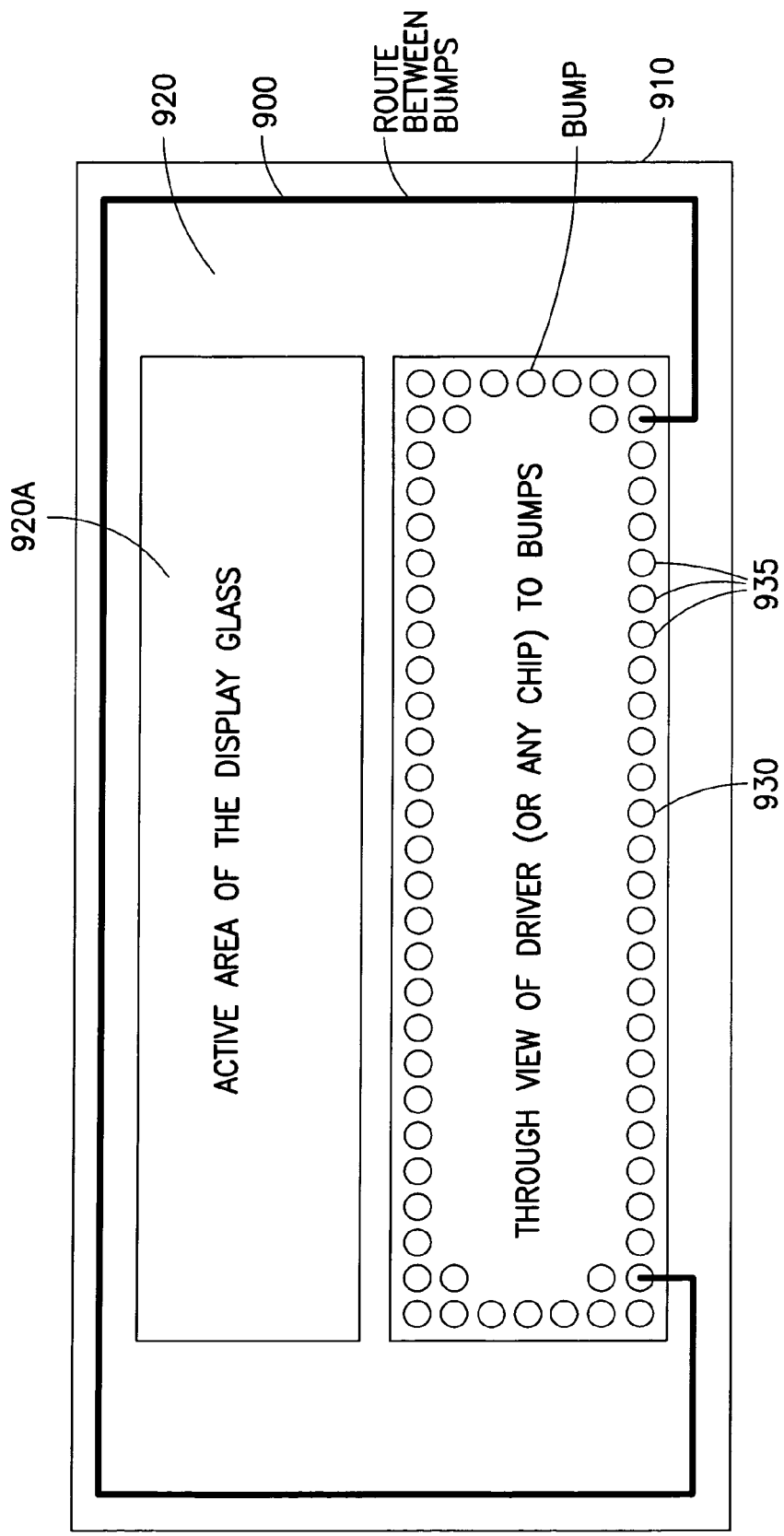
FIG. 9 is an illustration of a previous attempt to implement broken panel detection.

It may be possible to provide a broken detection of the touch screen or display panel via a trace 900 as is shown in FIG. 9. The trace 900 is routed around the border of the display panel 910. The trace 900 may be formed of indium-tin-oxide (ITO) formed on a surface of the display glass 920, and generally around an active area 920A of the display glass 920. Also shown is a through-view of a driver (or any chip) 930 to the underlying electrically conductive bumps 935. The trace 900 is connected to at least two of the bumps 935. Should the display glass 920 crack or break it is assumed that the electrically conductive (e.g., ITO) trace 900 will experience a break as well, and thus electrical conductivity between the two bumps 935 connected to the trace 900 is lost (an open circuit condition will exist). This open circuit condition is detectable via the two bumps 935.

Notice, however, that this technique would not detect a break in the glass that occurs only in the active area 920A of the display glass 920. Furthermore, this technique would only provide an indication that the display glass breakage had already occurred, and not an indication that display glass breakage may be about to occur (i.e. no warning will be generated that excessive force is being applied to the display glass 920).

Figure 1:
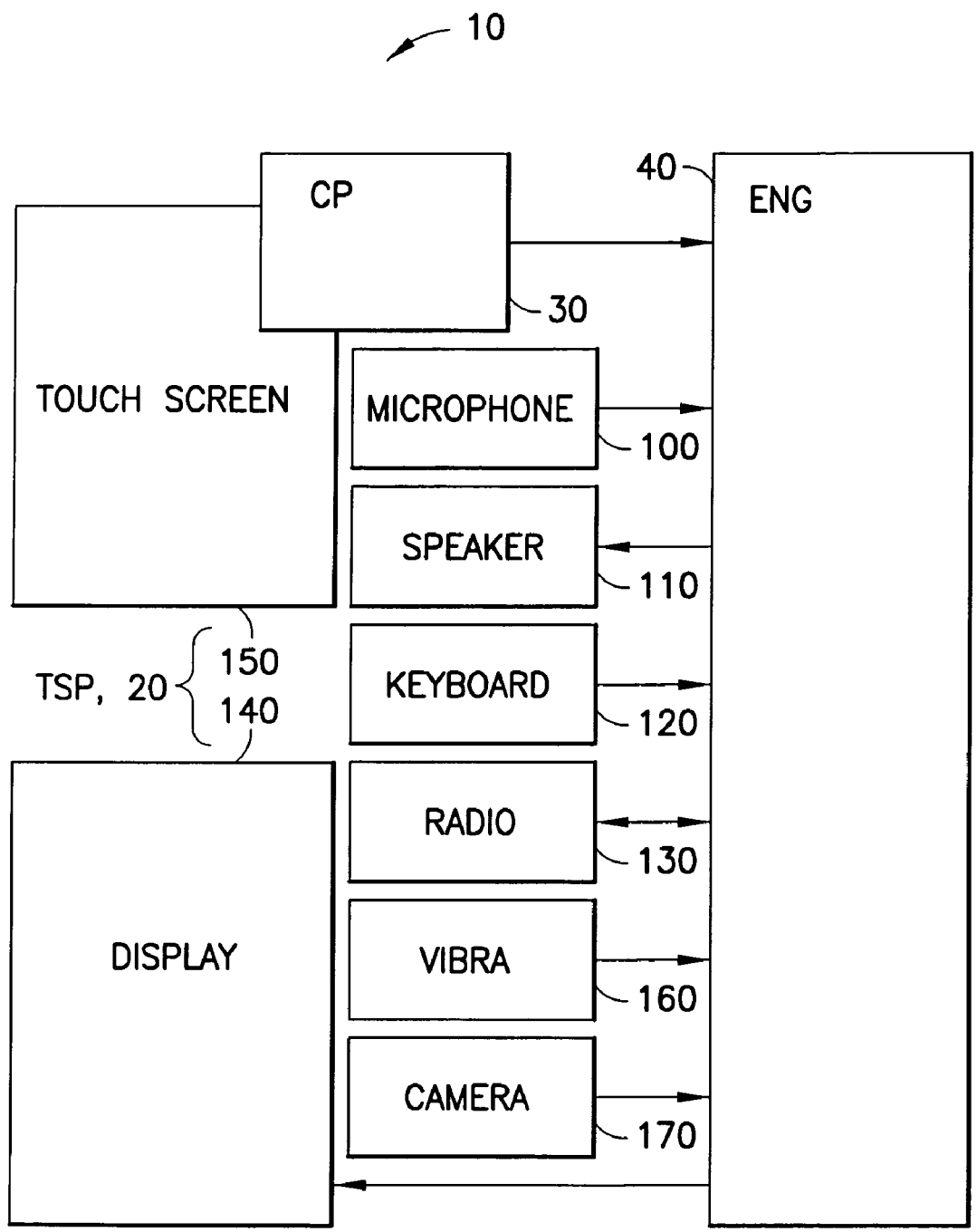
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1 a device 10 includes a display 140, a touch screen 150, conductive parts (CP) 30, and an engine (ENG) 40, and may include microphone 100, speaker 110, keyboard 120, radio 130, vibra 160, and camera 170. The touch screen 150 contains the CP 30.

The microphone 100 converts audio from acoustic waves to electrical format. The speaker 110 converts audio from electrical format to acoustic waves. The keyboard 120 converts information from pressed keys to electrical format. The radio 130 converts electrical information from/to radio waves. The display 140 converts electrical information to readable format. The touch screen 150 converts physical touch to an electrical format. The vibra 160 converts electrical information to mechanical force. The camera 170 converts images based on different levels of light of the object. The device includes the ENG 40 and may also include software which controls these conversions as well as a user interface. The display 140 and the touch screen 150 may further be integrated together such as a touch screen panel (TSP) 20 that forms a part of the display module 210 shown in FIG. 2.

The TSP 20 is capable of receiving input from a user and may further be capable of displaying information received from the ENG 40. The TSP 20 may be coupled to a ROC 800 that has functionality as described below in regards to FIG. 11. The TSP 20 may also include GD 410, SD 400, and pixel cells with touch screen sensors (PCTSS) 1110, also shown in FIG. 11.

The CP 30 is capable of detecting a contact. The CP 30 may be implemented between a top and a bottom glass. The implementation of CP 30 may be further implemented as described below in regards to FIG. 10.

The ENG 40 is capable of receiving input from the TSP 20, microphone 100, keyboard 120, radio 130, vibra 160, and camera 170, and is further capable of outputting to the TSP 20.

The exemplary embodiments of this invention may be implemented at least in part by computer software executable by the ENG 40 of the device 10, or by hardware, or by a combination of software and hardware.

Figure 2:
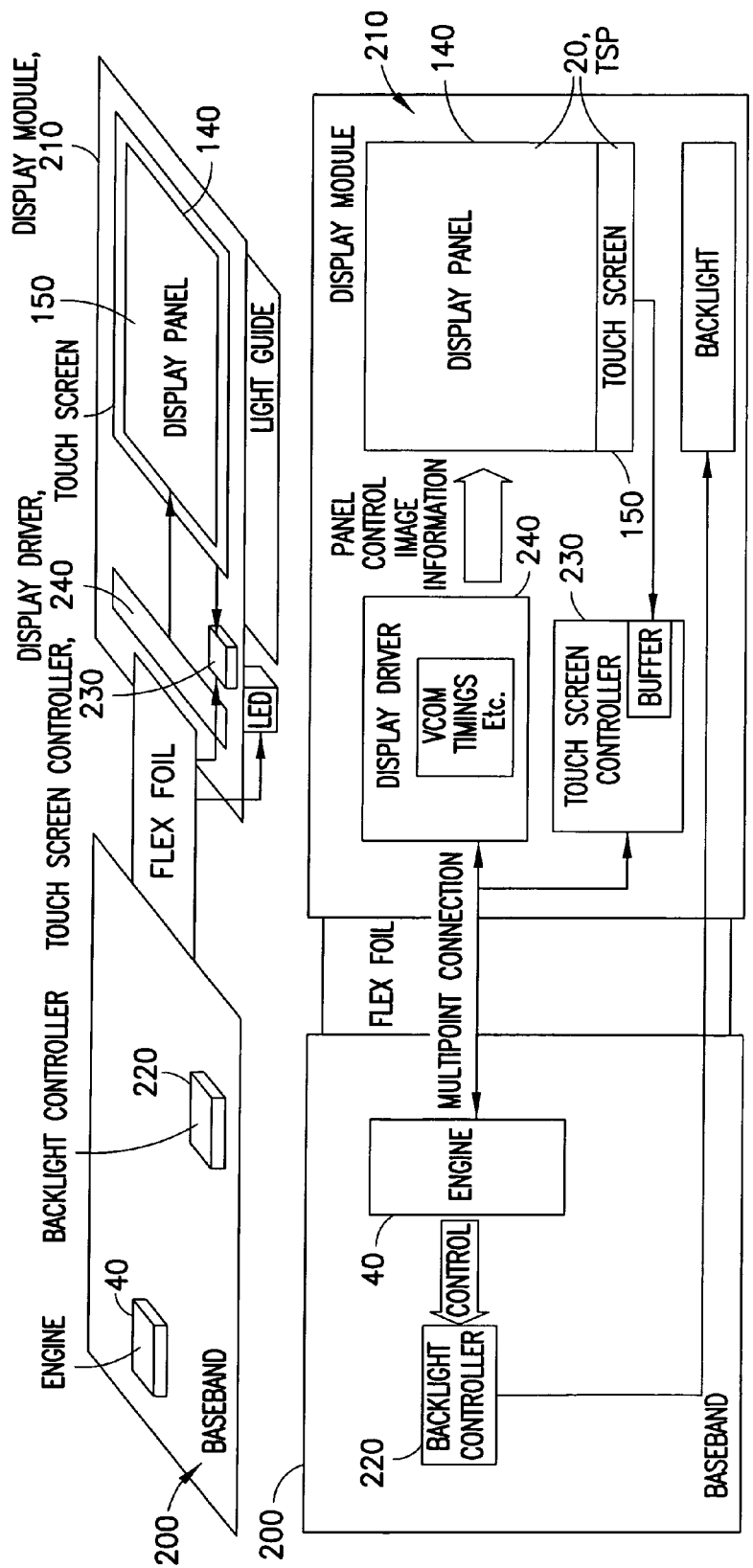
FIG. 2 shows the internal operation of a mobile device that contains a touch screen.

The device 10 may also include a base band module 200 and the display module 210, as shown in FIG. 2. The base band module 200 includes the ENG 40 at least a backlight controller 220. The display module 210 contains the display panel 140, a display driver 240, the touch screen 150, and a TSC 230. The display driver 240 generates VCOM, timings, etc. The ENG 40 controls the image displayed on the display panel 140 and it can also read touch screen values via the TSC 230. The display panel 140 and the touch screen panel 150 may be integrated together as the TSP 20. The ENG 40 may also control the backlight controller 220 which sets the level of the display screen backlight.

Figure 3:
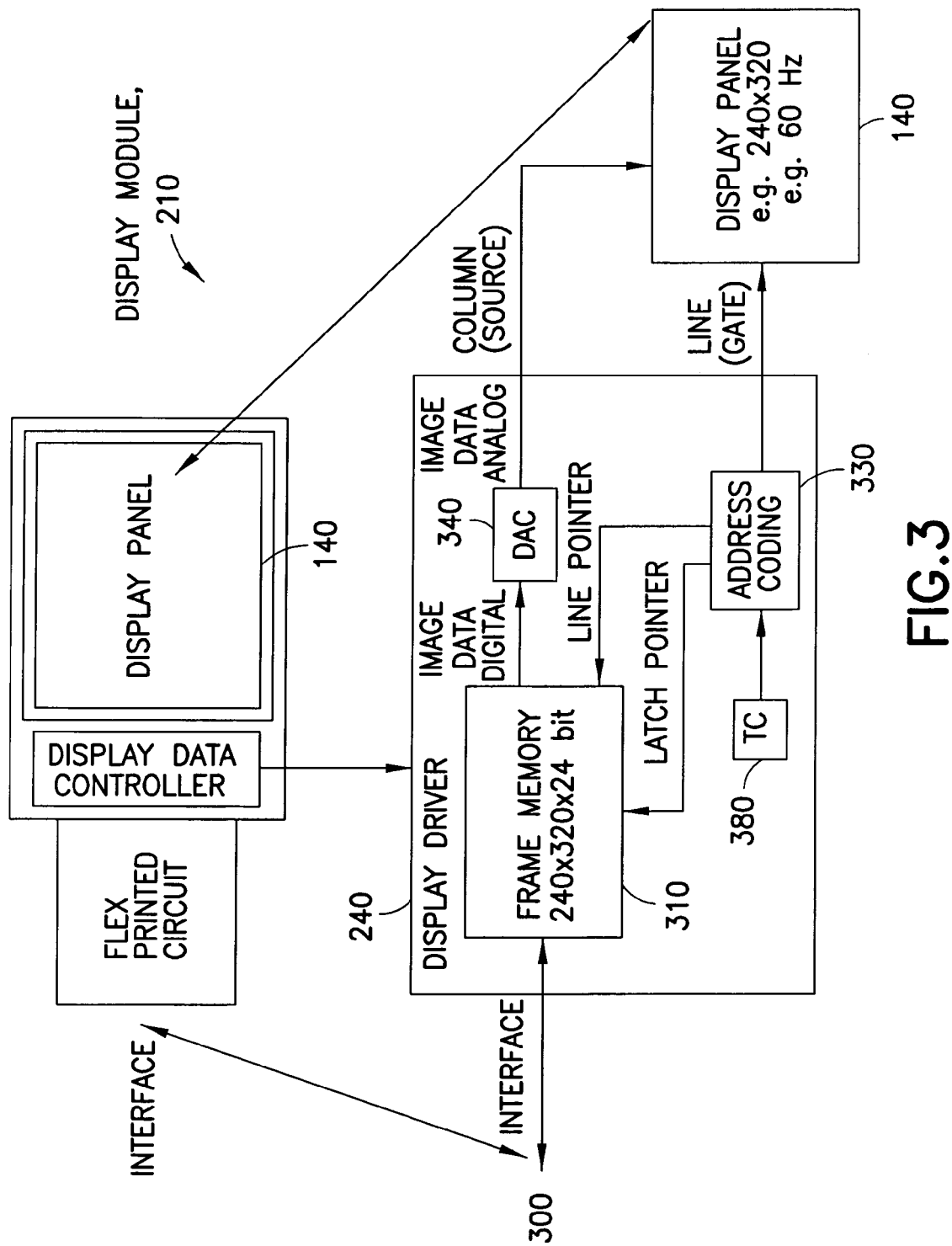
FIG. 3 illustrates display panel pixel cell control.

The display 140 may be made of liquid crystal material and may be referred to as a LCD. FIG. 3 illustrates a diagram of the display module 210 having a display panel 140 with pixel resolution of 240×320. An interface 300, which includes a printed circuit, is coupled to the display driver 240. The display driver 240 includes a frame memory 310, a TC 320, an address coding block 330, and a DAC 340.

Figure 4:
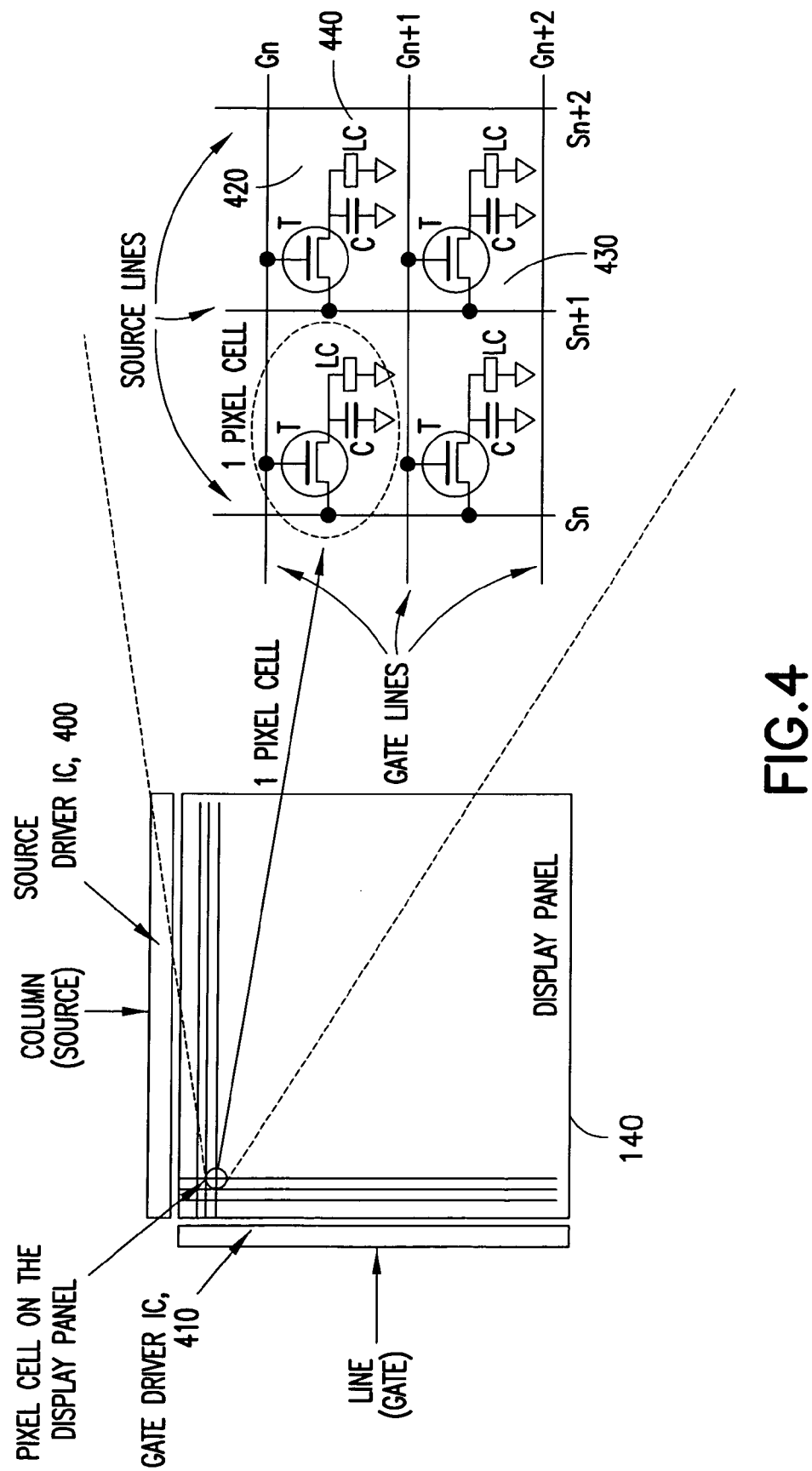
FIG. 4 is a further illustration of display panel pixel cell control.

The diagram shown in FIG. 4 illustrates in greater detail the display panel 140 of FIG. 3. Considering FIGS. 3 and 4 together, image data is inputted from the interface 300 to the frame memory 310 on the display driver 240. The source of the image data may be the ENG 40. The TC 320 sends timing information to the address coding block 330 where control signals are generated. Some of these control signals address the frame memory 310. Image data read from the frame memory 310 is a digital value or, more specifically a digital grey scale value. This digital image data is inputted into the DAC 340 where the value of the data is changed to analog image data for the column (Source: Sn, Sn+1, etc.). This analog image data is inputted to the display panel 140, where a storage location for the image data is controlled by the address coding block 330 via column (source) and line (Gate: Gn, Gn+1, Gn+2, etc) control signals. The Line (Gate) control signals are of a digital value ('0' or '1') used for selecting a line of the pixels on the display panel where the analog information of the image data from column (source) is stored.

Figure 5:
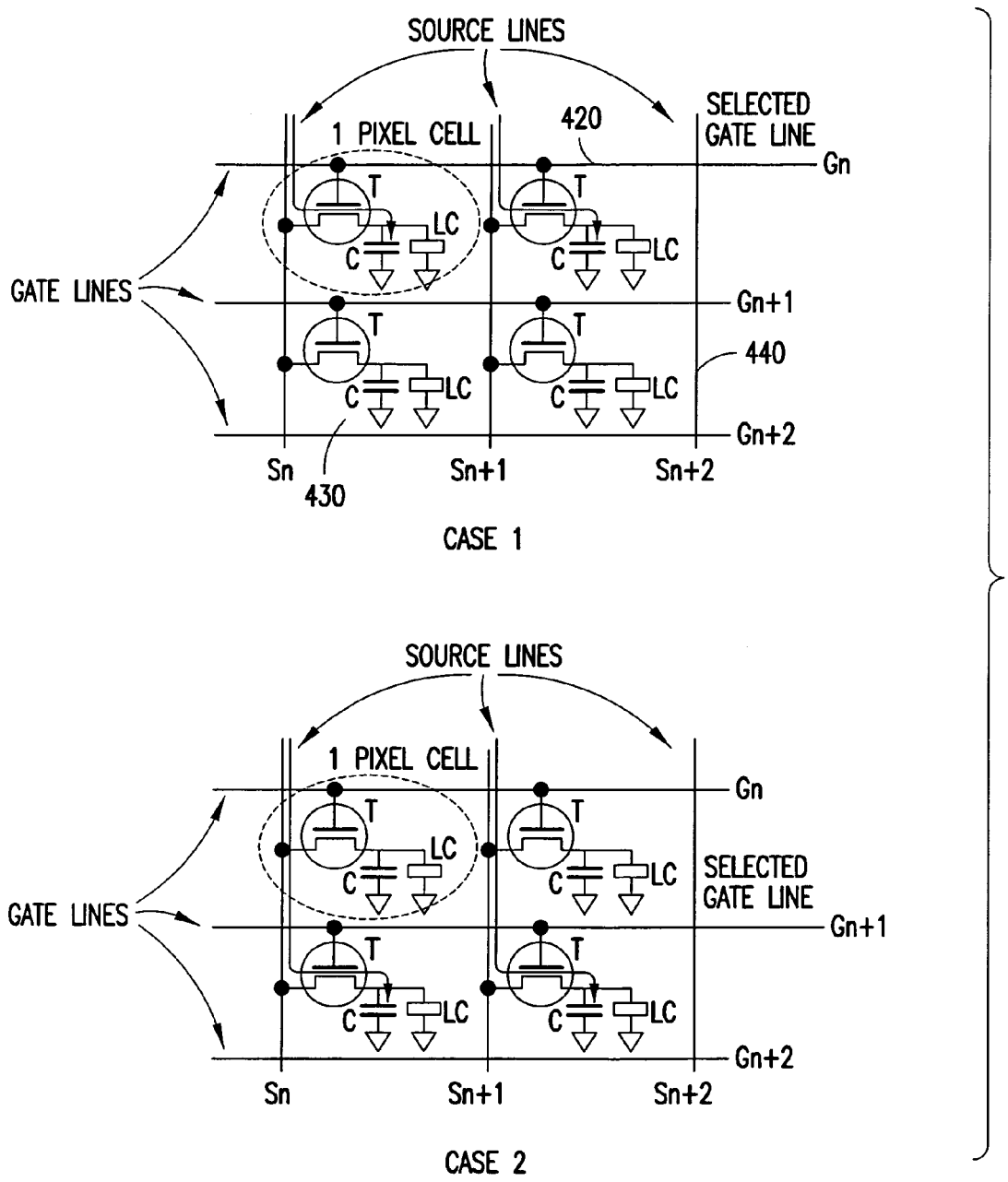
FIG. 5 is an even further illustration of display panel pixel cell control.

The operation of a pixel cell, which is visible to the user, in regards to the display module of FIG. 4 is also shown in FIG. 5. The source driver 400 outputs analog image data values on the source lines (Sn, Sn+1, Sn+2, etc.). The gate driver 410 outputs a selection corresponding to the used gate line, and then all pixel cells of the selected gate line are updated. Only one line of pixels is updated at the same time, and the pixels are not updated on other lines. This update starts on one edge of the display panel 140 and is updated every next line. The following is an example of how two rows of pixel cells are updated. The analog image data is outputted on source lines (Sn, Sn+1, Sn+2, etc). There is selected a gate line Gn, which controls a switch of the pixel cell (transistor T 420 in this case), which is closed after the gate line selection Gn. Other gate lines (not gate line Sn) maintain open switches of other pixel cells. The analog image data can flow through the switch and start to load the memory 430 (charging a capacitor in this case). This loading also controls the liquid crystal cell (LC) 440 of the pixel cell. This loading continues until there is selected another gate line (not Gn). The loaded memory 430 (Capacitor C) keeps the analog value (visible grey level of the pixel cell) until the same gate line has been re-selected and reloaded. FIG. 5 shows two cases of analog image values loaded onto the gate lines. Case 1 shows two lines of pixels loaded onto gate line Gn while case 2 shows two line of pixels loaded onto gate line Gn+1.

Figure 6A:
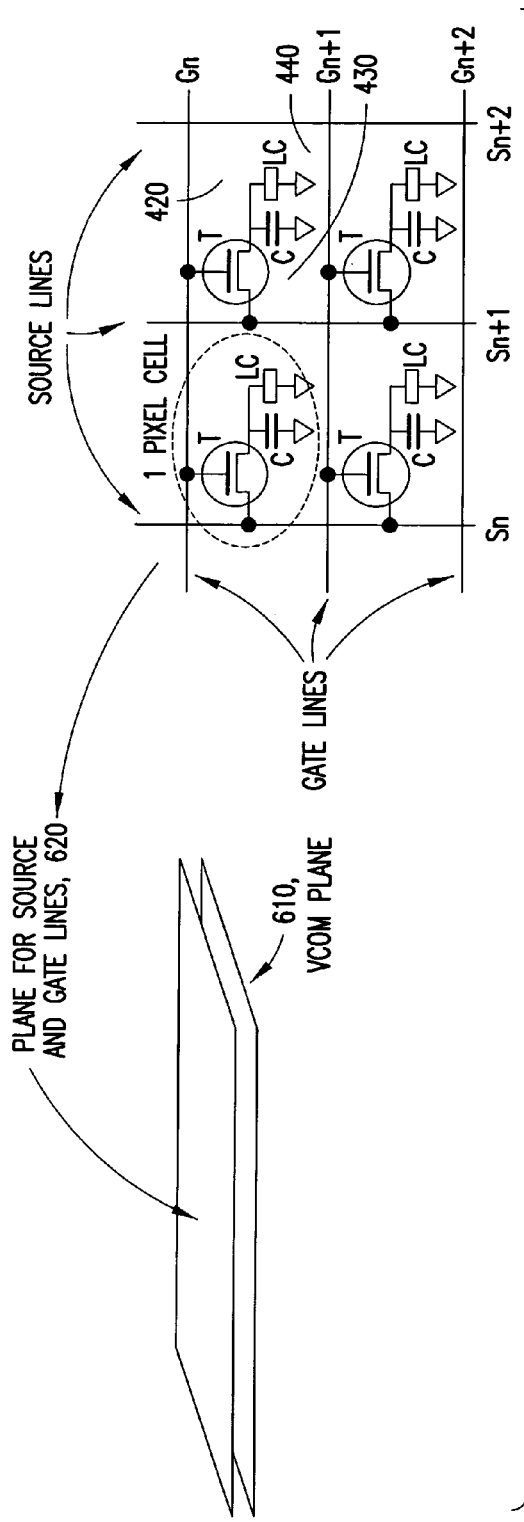
FIG. 6A illustrates a display panel further including a VCOM plane.
Figure 6B:
FIGS. 6B and 6C provide graphs of the VCOM voltage during image frame updating as static and dynamic voltages respectively.
Figure 6C:

FIG. 6 further details the display panel pixel cell control. In FIG. 6A, the display panel 140 contains a VCOM plane 610. The VCOM 610 plane is a common voltage plane that is placed under the plane 620 that carries the source and gate lines. The voltage difference between the source and gate lines plane 620 and the VCOM 610 plane may be several volts. FIG. 6B, shows the VCOM voltage as a static voltage during image frame updating. FIG. 6C, shows the VCOM voltage changing during image frame updating.

In reference to FIG. 7, there is an illustration of two different touch screen panel configurations. FIG. 7A provides for a separated touch screen 700 that is based on a sheet structure. A sheet is used as a pressure sensor and two values are measured at the end of the sheet to calculate a resistance difference. FIG. 7B then shows the touch screen panel 700 of FIG. 7A as implemented into a device. The touch screen panel 700 is on upper glass with a connector running to a driver IC and a connector from the touch screen panel 700. FIG. 7C provides for a display integrated touch screen 750 that is based on a matrix structure. Cross points on the display 750 are used as pressure sensors. All of the cross points are measured in order to calculate the voltage differences. A cross point may be implemented at every display panel pixel or, e.g., every four pixels. FIG. 7D then shows the touch screen panel 750 of FIG. 7C as implemented into a device. The touch screen panel 750 is between an upper and lower glass with only one connector running to the driver IC.

Figure 8:
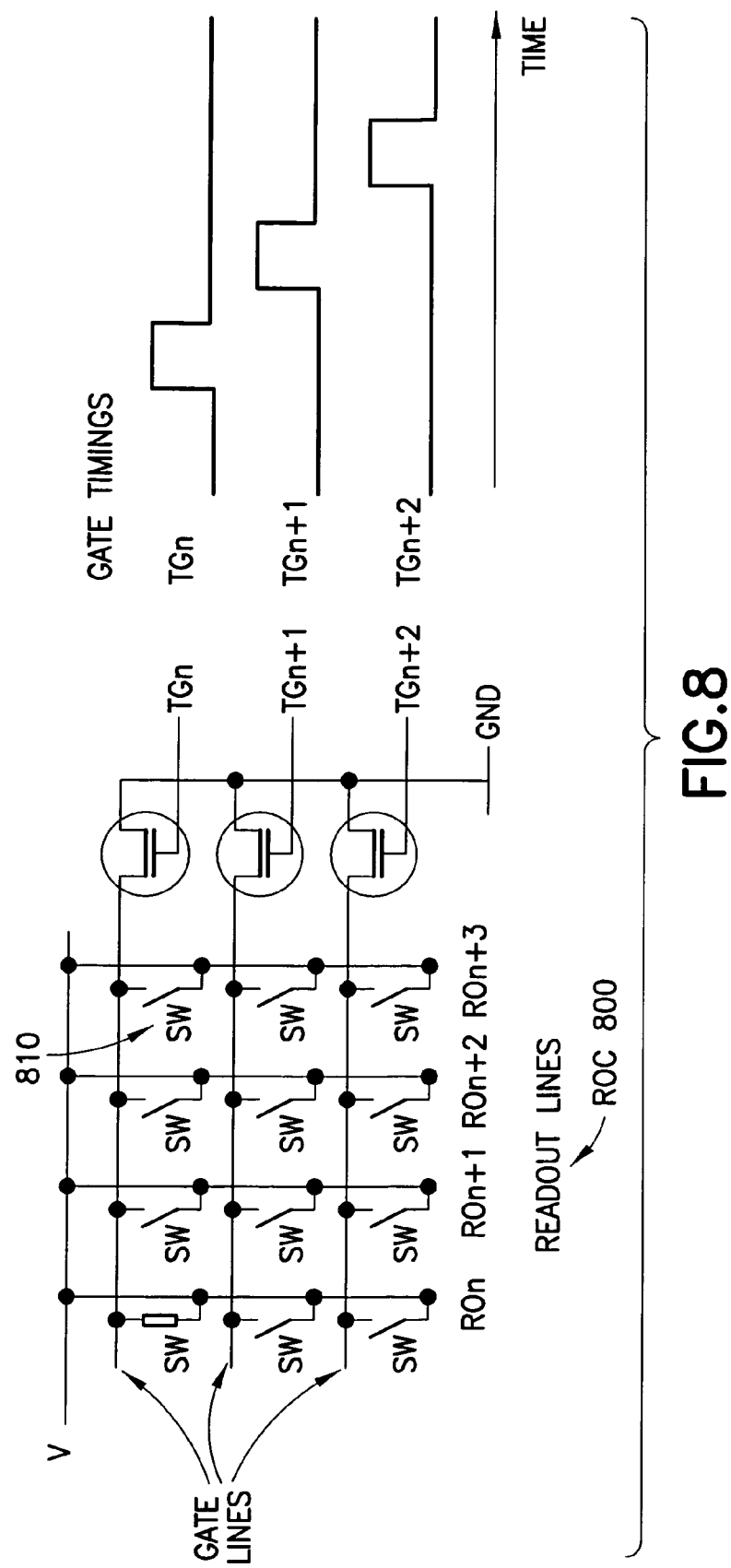
FIG. 8 is an illustration of display integrated touch screen scanning.

Reference is made to FIG. 8 to show touch screen scanning. The display integrated touch screen based on a matrix structure 750 includes gate (TG) and RO lines. Every line is selected once during scanning. The selected line is readout to a ROC 800. The matrix touch screen 750 may operate at the same time as the display panel pixel cell control and the information is read via RO lines. The matrix based touch screen 750 may be considered to operate in the same way as a keyboard, i.e., the user presses the touch screen and switches (SW) 810 are closed.

In one exemplary embodiment of this invention display integrated touch screen panel with conductive switch matrix construction is used to detect excessive force on the display or touch screen panel such as TSP 20 and deliver a warning to the user. The TSP 20 may be arranged similar to the matrix touch screen 750. Heights of the CP 30 are defined so that they can detect a pressure that may cause damage to the TSP 20.

Figure 10:
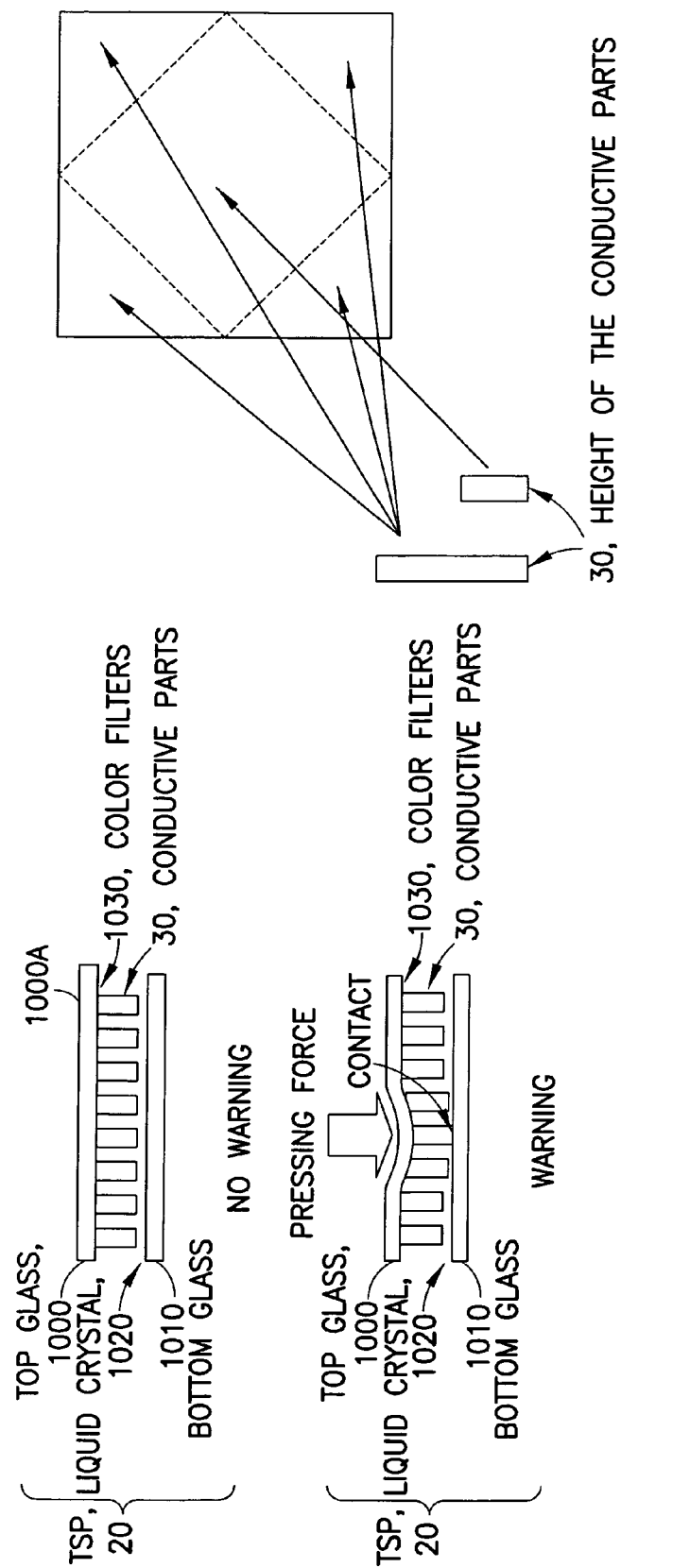
FIG. 10 shows the use of varying heights of conductive parts to trigger a warning.

One exemplary embodiment of this invention is shown in FIG. 10. CP 30 are implemented between a top layer 1000 and a bottom layer 1010. These layers may be of glass and may contain liquid crystal material 1020 and color filters 1030. The height of the CP 30 may be different in different locations of the TSP 20. The top layer 1000 additionally comprises input surface 1000A, which receives tactile input from the user. The tactile input may be from a stylus pen or the user's own finger. If the CP 30 contacts the bottom layer 1010, the presence of the contact generates a signal. This signal allows for the ENG 40 to cause a warning message to be displayed to the user cautioning that an excessive pressing force is being applied to the top glass 1000 of the TSP 20. An excessive force herein is defined as a force that is less than the breaking threshold for the input surface 1000A. The varying heights of the CP 30 may be implemented as longer CPs 30 alongside the border of the TSP 20 and shorter CPs 30 in the middle of the TSP 20. This allows for a device to take advantage of greater support around the border of the TSP 20 and where there is greater tolerance to a user's applied force.

Figure 11:
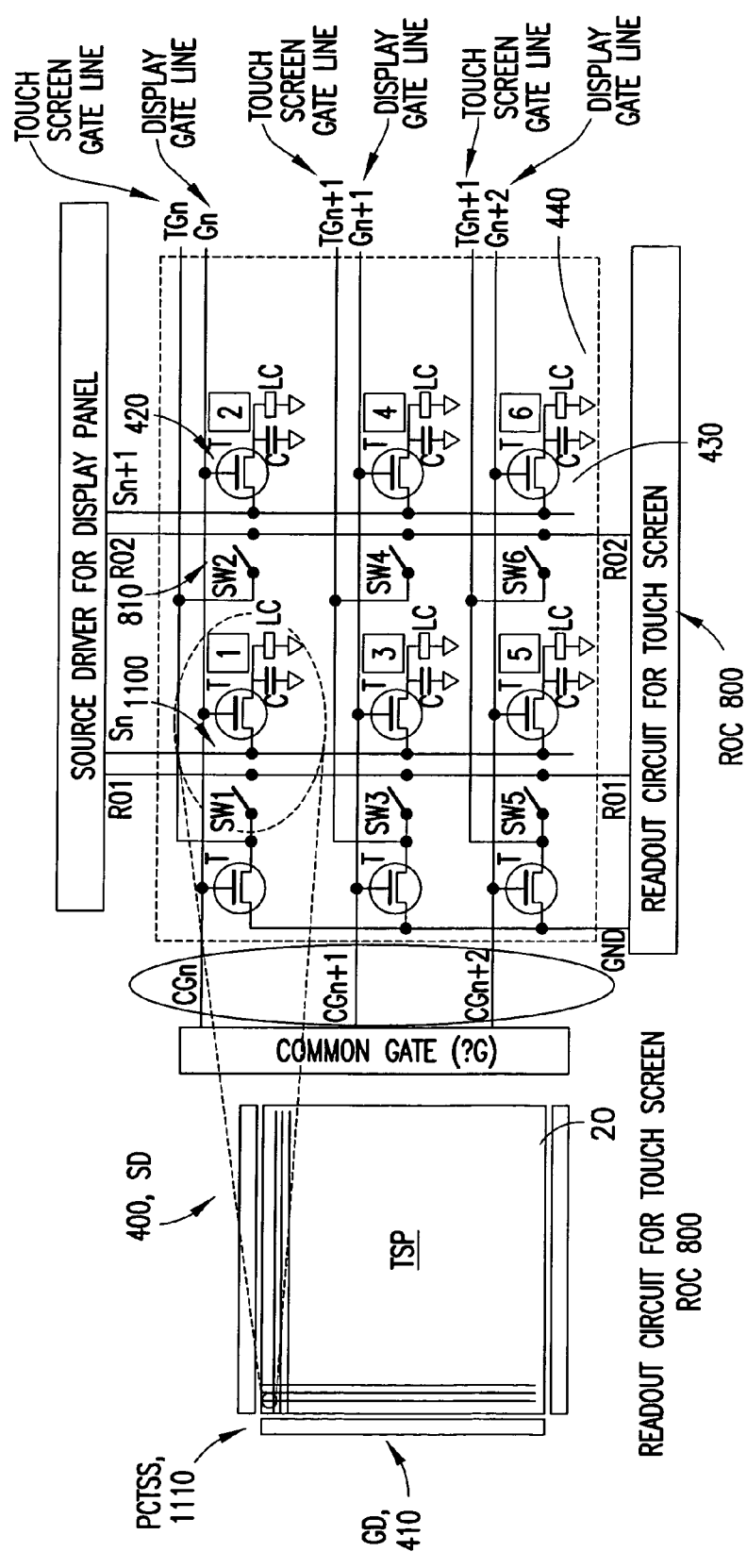
FIG. 11 shows the operation of the display panel and touch screen panel according to the device of FIG. 10.

In reference to FIG. 11 there is an illustration of an exemplary embodiment of the touch screen. The touch screen is shown as a display panel with an integrated touch screen such as TSP 20 that is coupled to ROC 800. TSP 20 may be arranged similar to that of the matrix touch screen 750. TSP 20 includes GD 410, ROC 800, and PCTSS 1110. The TSP 20 receives input from the SD 400 and from the GD 410. The input of SD 400 is referred to as Sn and the input from the GD 410 is TGn (for a touch screen gate line) and Gn (for a display gate line). The PCTSS 1100 includes transistors (T) 420, touch sensors embodied as switches (SWn) 810, capacitors (C) 430, and liquid crystal cells (LC) 440. The GD 410 may include the same number of lines that are used for the display panel 140, e.g., 320 lines (QVGA, 240×320). Transistors (T) 420 for the touch screen matrix may be implemented in the same way as the pixel cell transistors on the TSP 20. The scanning occurs for (PCTSS) 1110 as follows: CGn line is active when Pixel Cells 1 and 2 are updated (Gn line for selection and Sn and Sn+1 for loading) and SW1 and SW2 are read out (TGn line for selection and RO1 and RO2 lines for reading).

Figure 12:
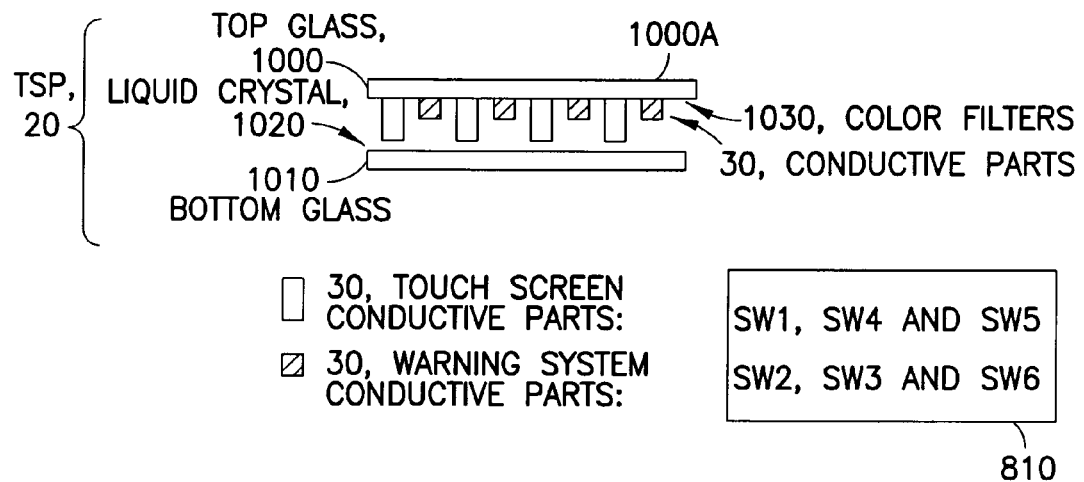
FIG. 12 shows the implementation of FIGS. 10 and 11 into a display integrated touch screen panel with conductive switch matrix.
Figure 13:
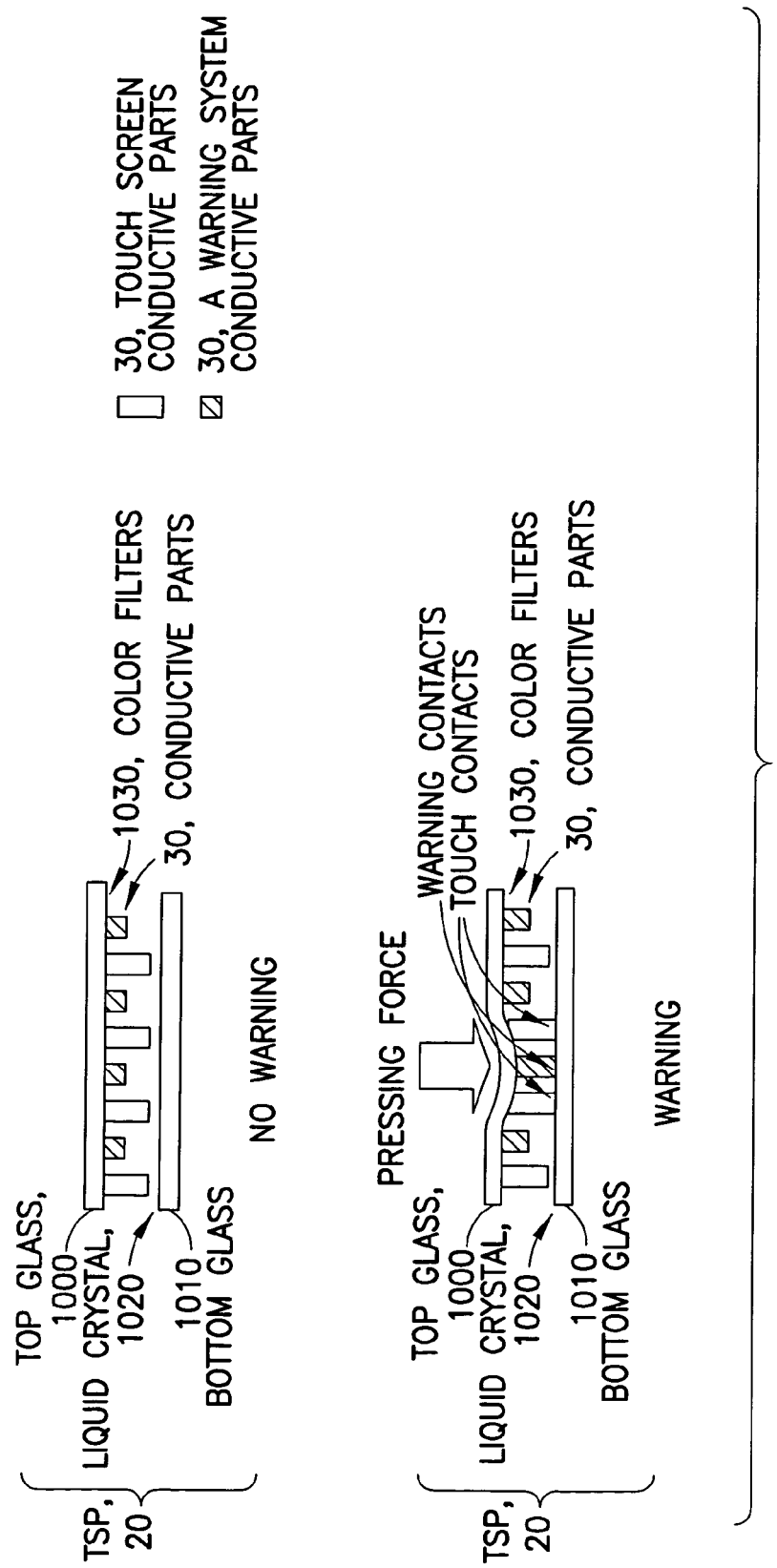
FIG. 13 shows the warning trigger for the device shown in FIG. 12.

FIG. 12, according to one exemplary embodiment, shows the embodiment of FIG. 11 and specifically TSP 20 embodied as a display integrated touch screen panel with conductive switch matrix. In a display integrated touch screen panel with conductive matrix the touch screen panel sensor is integrated onto the display panel similar to the matrix touch screen 750 and is configured to function under single touch, multi-touch, and writing conditions. The CP 30 of the display integrated touch screen panel with conductive matrix are implemented with varying heights. The longest CP 30 are for a touch screen function and the shortest CP 30 are for a warning function. As a user presses down on TSP 20, SWn 810 are switched and the specific SWn's that are switched depends on the force the user exerts and the location of the force on the TSP 20. Depending on the SWn that are switched a warning message cautioning the user of exerting too much force may be displayed. The display of the warning message may be in one of the human senses e.g. mechanical, visual, or audible format. Mechanical format is herein defined as format that may be of tactile feeling. FIG. 13 shows the warning and no warning situations in regards to FIG. 12 as excessive force is applied to the TSP 20.

Figure 14:
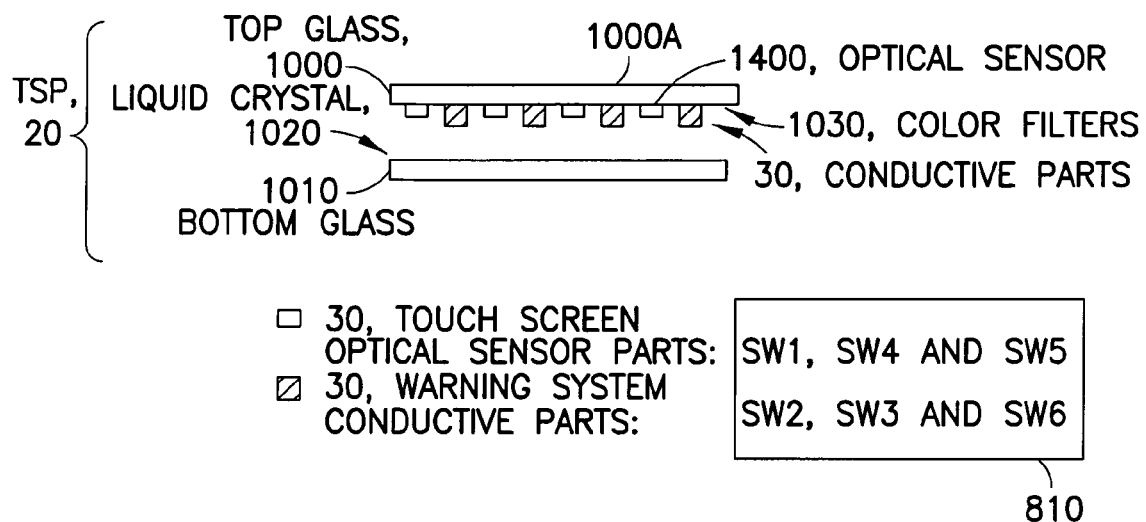
FIG. 14 shows the implementation of FIGS. 10 and 11 into an optical sensor based touch screen panel.
Figure 15:
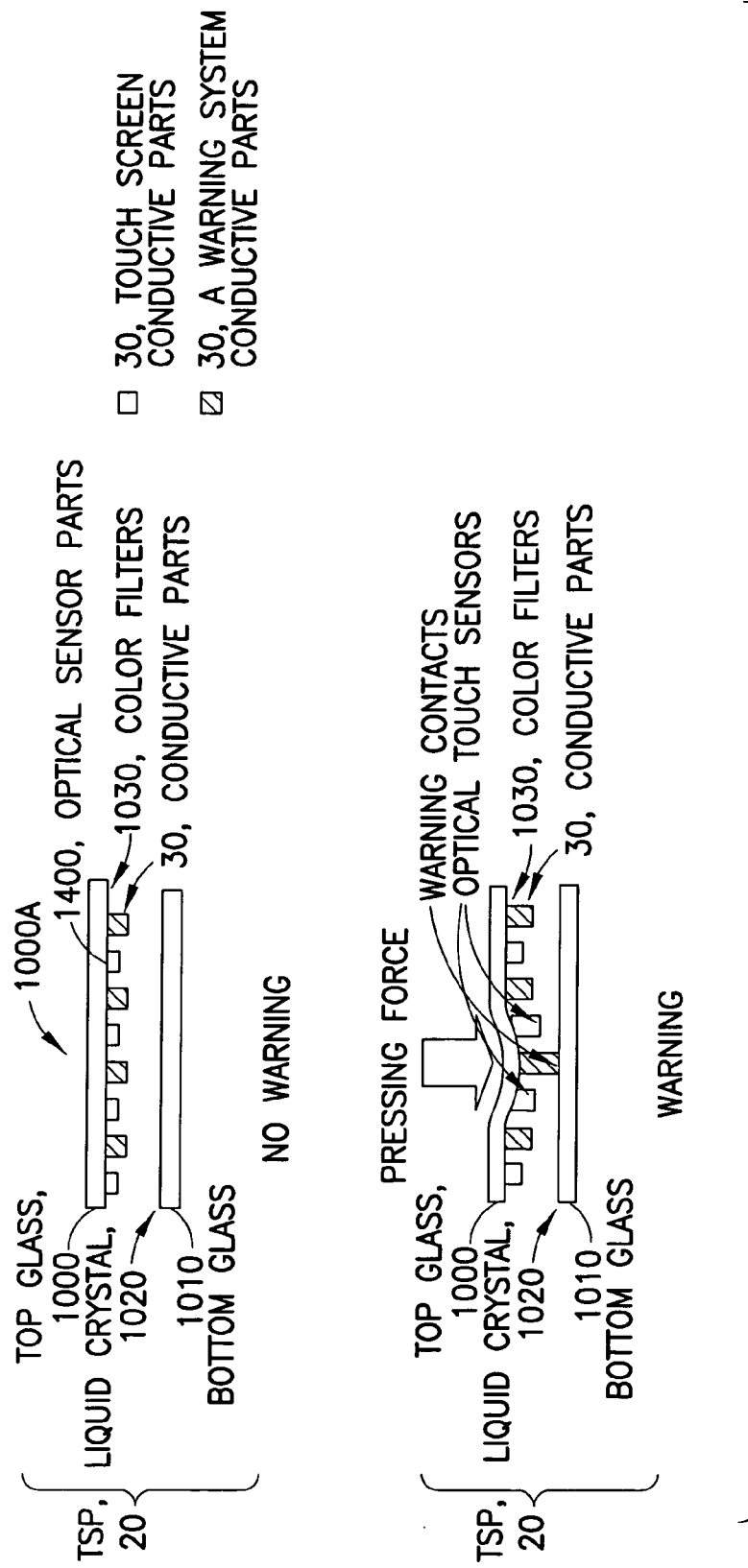
FIG. 15 shows the warning trigger for the device shown in FIG. 14.

FIG. 14 according to another exemplary embodiment, shows the embodiment of FIG. 11 and specifically TSP 20 embodied as an optical sensor based touch screen panel. The operation of FIG. 14 is similar to what was described for FIG. 12. In an optical sensor based touch screen panel sensors 1400 detect light and operate in conjunction with CP 30. The optical sensor parts 1400 are for a touch screen function and the CP 30 are for a warning function. FIG. 15 shows the warning and no warning situations in regards to FIG. 14 as excessive force is applied to the TSP 20.

Figure 16:
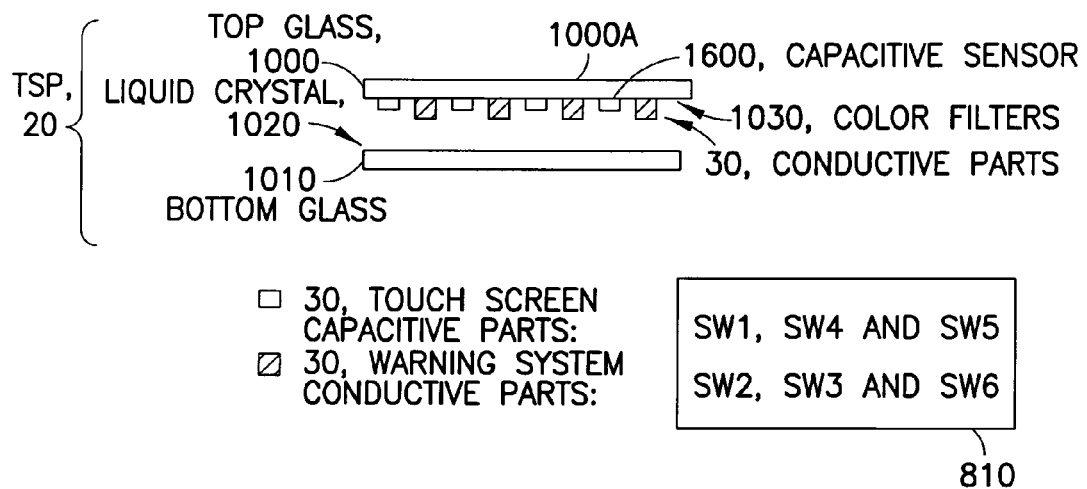
FIG. 16 shows the implementation of FIGS. 10 and 11 into a capacitive based touch screen panel.
Figure 17:
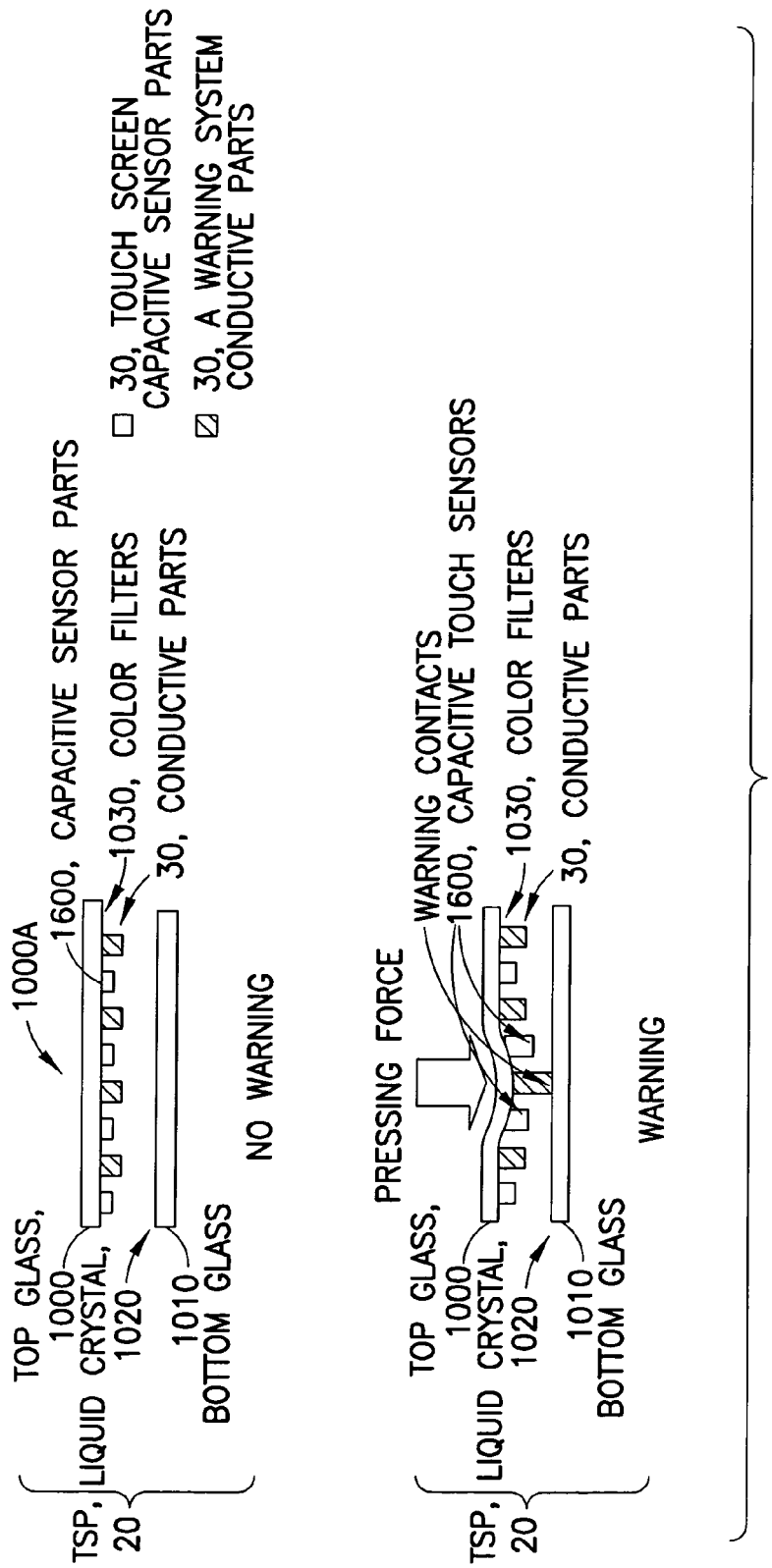
FIG. 17 shows the warning trigger for the device shown in FIG. 16.

FIG. 16 according to a further exemplary embodiment, shows the embodiment of FIG. 11 and specifically TSP 20 embodied as a capacitive based touch screen panel. The operation of FIG. 16 is similar to what was described in FIG. 12. In a capacitive based touch screen panel sensors 1600 detect electrical current and operate in conjunction with CP 30. The capacitive sensor parts 1600 are for a touch screen function and the CP 30 are for a warning function. FIG. 17 shows the warning and no warning situations in regards to FIG. 16 as excessive force is applied to the TSP 20.

Figure 18:
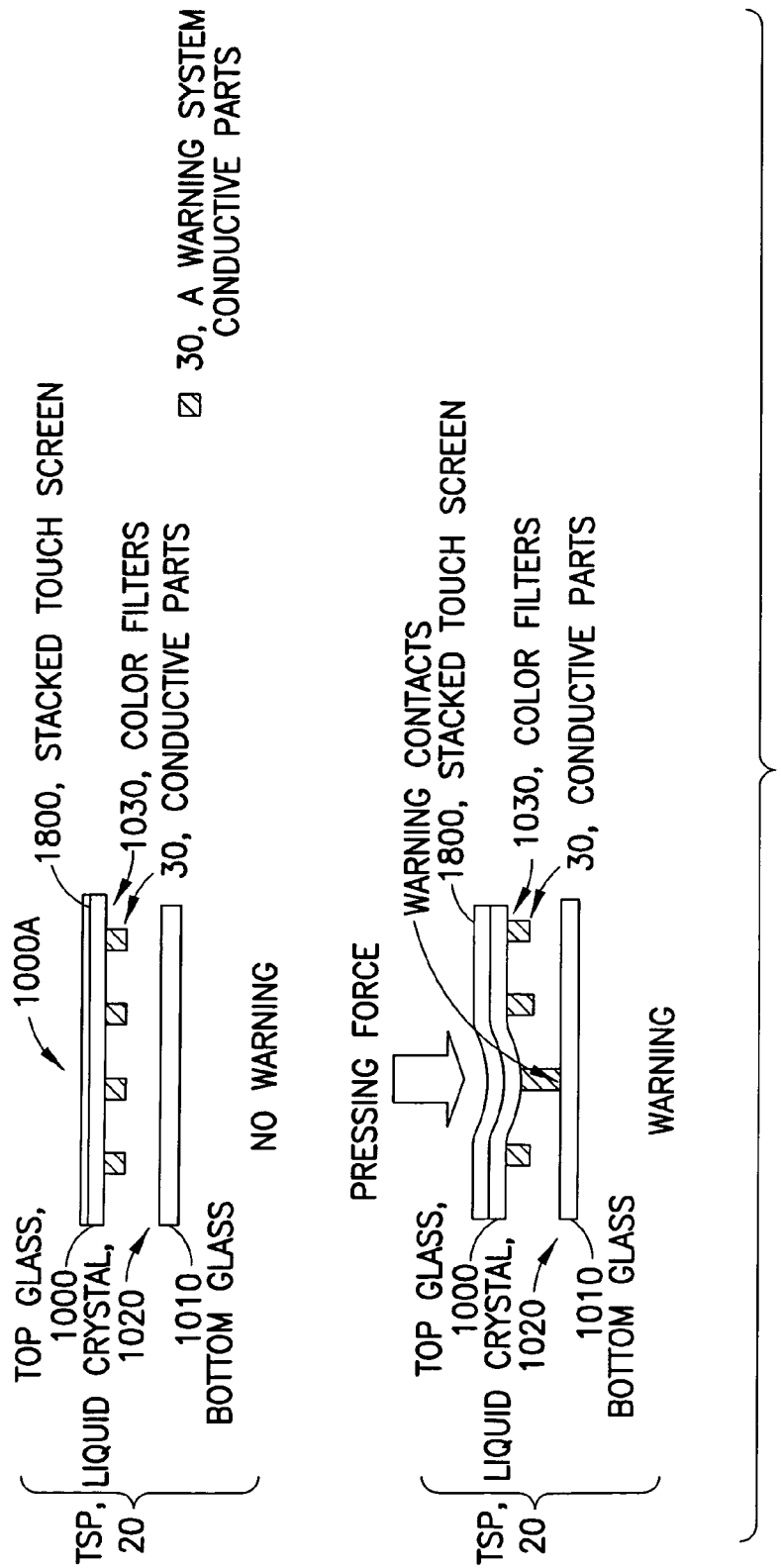
FIG. 18 shows the implementation of FIGS. 10 and 11 into a stacked touch screen along with the corresponding warning triggers.

FIG. 18 according to an even further exemplary embodiment, shows the embodiment of FIG. 11, where TSP 20 includes a stacked touch screen (resistive, capacitive, etc.) 1800. The stacked touch screen 1800 may be on the TSP 20 when CP 30 is included only for warning purposes. The stacked touch screen 1800 may also be under the TSP 20 e.g. in a conductive touch screen case. A warning and no warning situation are also illustrated as excessive force is applied to the TSP 20.

Figure 19:
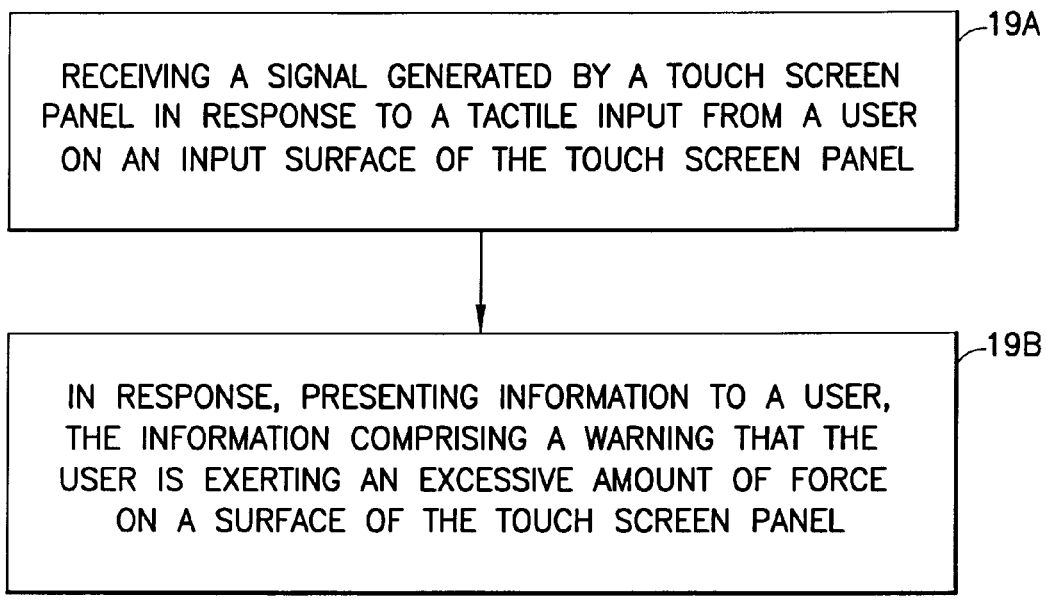
FIG. 19 is a logic flow diagram that illustrates a method, and the result of execution of computer program instructions, at the device in accordance with exemplary embodiments of this invention.

(A) Referring to FIG. 19, in accordance with an exemplary method at Block 19A, there is a step of receiving a signal generated by a touch screen panel 20 in response to a tactile input from a user on an input surface 1000A of the touch screen panel 20; and at Block 19B in response, presenting information to a user, the information comprising a warning that the user is exerting an excessive amount of force on a surface of the touch screen panel 20.

(B) The method in paragraph A, where the information is presented by at least one of mechanical, visual, or audible output.

(C) The method in paragraph A, where the signal generated by the touch screen panel 20 is the result of contact amongst conductive parts formed on a first layer and a second layer in the touch screen panel.

(D) The method in paragraph C, where the conductive parts within an area between the first layer and the second layer are of varying lengths.

(E) The method in paragraph (D), where the varying lengths of the CP 30 are divided into one of a touch screen function and a warning function, and where the signal is output only for contact amongst CP 30 and a bottom layer that are of the warning function.

(F) The method in paragraphs (D-E) where the CP 30 are implemented in a display integrated touch screen panel with conductive switch matrix.

(G) The method in paragraph (C) where the CP 30 are implemented in an optical sensor based touch screen panel.

(H) The method in paragraph (C) where the CP 30 are implemented in capacitive based touch screen panel.

(I) The method in paragraph (A) where the surface of the touch screen panel comprises a stacked touch screen.

(J) The method in paragraph (D) where the varying lengths of the conductive parts are greater along the border of the display on the touch screen panel.

It should be further appreciated that the exemplary embodiments of this invention pertain to apparatus at the touch screen panel 20, which may be embodied as an input surface configured to generate a signal in response to tactile input from a user; and an output configured to provide an output signal when the user is exerting an excessive amount of force on the input surface.

The various blocks shown in FIG. 19 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
  receiving a first signal generated by a touch screen device in response to a tactile input from a user on an input surface of the touch screen device;
  receiving a second signal generated by the touch screen device in response to the tactile input from a user on the input surface of the touch screen device;
  and
  in response to the second signal, presenting information to a user, the information comprising a warning that the user is exerting an excessive amount of force on a surface of the touch screen device,
  wherein the first signal is configured to be generated by coupling a plurality of first conductive parts to provide a touch screen function and the second signal is configured to be generated by coupling a plurality of second conductive parts with a bottom layer to provide a warning function.

2. The method as in claim 1, where the information is presented by at least one of mechanical, visual, or audible output.

3. The method as in claim 1, where the the plurality of first conductive parts are formed on a first layer and a second layer in the touch screen device.

4. The method as in claim 3, where the conductive parts are of varying lengths within an area between the first layer and the second layer.

5. The method as in claim 4 where the conductive parts are implemented in a display integrated touch screen panel with conductive switch matrix.

6. The method as in claim 3 where the conductive parts are implemented in an optical sensor based touch screen panel.

7. The method as in claim 3 where the conductive parts are implemented in a capacitive based touch screen panel.

8. The method as in claim 1 where the surface of the touch screen device comprises a stacked touch screen.

9. The method as in claim 4, where the lengths of the conductive parts are greatest around a periphery of the area.

10. A computer readable medium encoded with a computer program executable by a processor to perform actions comprising:
  receiving a first signal generated by a touch screen device in response to a tactile input from a user on an input surface of the touch screen device;
  receiving a second signal generated by the touch screen device in response to the tactile input from a user on the input surface of the touch screen device;

and in response to the second signal, presenting information to a user, the information comprising a warning that the user is exerting an excessive amount of force on a surface of the touch screen device, wherein the first signal is configured to be generated by coupling a plurality of first conductive parts to provide a touch screen function and the second signal is configured to be generated by coupling a plurality of second conductive parts with a bottom layer to provide a warning function.

11. The computer readable medium encoded with a computer program of claim 10, where the information is presented by at least one of mechanical, visual, or audible output.

12. The computer readable medium encoded with a computer program of claim 10, where the plurality of first conductive parts formed on a first layer and a second layer in the touch screen device.

13. The computer readable medium encoded with a computer program of claim 12, where the conductive parts are of varying lengths within an area between the first layer and the second layer.

14. The computer readable medium encoded with a computer program of claim 13, where the conductive parts are implemented in a display integrated touch screen panel with conductive switch matrix.

15. The computer readable medium encoded with a computer program of claim 12, where the conductive parts are implemented in an optical sensor based touch screen panel.

16. The computer readable medium encoded with a computer program of claim 12, where the conductive parts are implemented in a capacitive based touch screen panel.

17. The computer readable medium encoded with a computer program of claim 10, where the surface of the touch screen device comprises a stacked touch screen.

18. The computer readable medium encoded with a computer program of claim 13, where the lengths of the conductive parts are greatest around a periphery of the area.

19. An apparatus, comprising:

an input surface configured to generate a first signal in response to tactile input from a user, said input surface further configured to generate a second signal in response to tactile input from a user;

an output configured to provide a warning in response to the second signal to indicate that the user is exerting an excessive amount of force on the input surface, wherein the first signal is configured to be generated by coupling a plurality of first conductive parts to provide a touch screen function and the second signal is configured to be generated by coupling a plurality of second conductive parts with a bottom layer to provide a warning function.

20. The apparatus as in claim 19, where the input surface comprises a touch screen panel and where the touch screen panel is integrated into a display panel.

21. The apparatus as in claim 20, where the tactile input comprises conductive parts.

22. The apparatus as in claim 21, where the conductive parts are of varying lengths within an area of the input surface.

23. The apparatus as in claim 19 implemented as a display integrated touch screen panel with conductive switch matrix.

24. The apparatus as in claim 19 implemented as an optical sensor based touch screen panel.

25. The apparatus as in claim 19 implemented as a capacitive based touch screen panel.

26. The apparatus as in claim 19 implemented as a stacked touch screen.

27. The apparatus as in claim 22 where the lengths of the conductive parts are greatest around a periphery of the area.

28. The method as in claim 1, where the plurality of first and second conductive parts have one common part.

29. The computer readable medium encoded with a computer program of claim 10, where the plurality of first and second conductive parts have one common part.

30. The apparatus as in claim 19, where the plurality of first and second conductive parts have one common part.

* * * * *